Patented Aug. 30, 1932

1,874,524

UNITED STATES PATENT OFFICE

WINFRID HENTRICH, OF WIESDORF-ON-THE-RHINE, ERNST TIETZE, OF COLOGNE-ON-THE-RHINE, AND ANTON OSSENBECK, OF COLOGNE-MULHEIM, GERMANY, ASSIGNORS TO GENERAL ANILINE WORKS, INC., OF NEW YORK, N. Y., A CORPORATION OF DELAWARE

DIAZO-AMINO COMPOUNDS

No Drawing. Application filed July 24, 1929, Serial No. 380,752, and in Germany August 7, 1928.

The present invention relates to new diazo-amino compounds. More particularly it relates to compounds of the probable general formula:

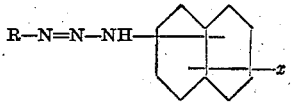

wherein R stands for the residue of a diazotizable amine suitable for producing dyestuffs, such as a benzene nucleus, a naphthalene-, anthraquinone- or carbazol-nucleus, $x$ stands for a carboxylic acid- or a sulfonic acid-group, and wherein R may be substituted by substituents of the group consisting of alkyl, the nitro group and halogen.

Our new compounds are obtainable by causing to react upon each other, advantageously in about molecular quantities and at low temperature, say at temperatures not higher than about 30–40° C., a diazonium compound obtained in the usual manner from a corresponding primary amine of aromatic character suitable for producing azo dyestuffs, and such a naphthyl amine sulfonic acid or carboxylic acid as does not couple to form an azo-dyestuff. The formation of an azo dyestuff does not take place, when the naphthalene nucleus is substituted in para-position to the amino group or when the relative position of the substituents hinders coupling to form an azo dyestuff. Such naphthyl amino compounds are well known to every one skilled in the art, part of them being mentioned in the examples hereafter described.

In carrying out the invention, we prepare a diazo solution by diazotizing in the usual manner the primary amine of aromatic character and introduce the same into an aqueous solution of a naphthyl amine sulfonic or carboxylic acid of the kind above specified. The formation of the new compounds proceeds extremely smoothly either in alkaline, neutral or weakly acid aqueous solution. From the concentrated solution the new diazoamino compounds partially separate during the reaction; the separation can be completed by the addition of salt. After carefully drying, the new products are obtained generally in form of brownish to yellowish crystalline powders. The action of acid reagents, such as formic acid, acetic acid, oxalic acid and sodium bisulfate, on the aqueous solutions of the salts of the new diazo-amino compounds causes in a very short time a smooth reconversion into the diazo compound and the acid of the naphthalene series used in the formation of the diazo-amino compound. Furthermore, the new products are stable towards heat, percussion, friction and neutral or alkaline substances, such as Glauber's salt, sodium carbonate, potassium carbonate and the like.

The new compounds are intended to find application in dyeing and printing and also for combating insect pests.

The following examples will illustrate the invention, without limiting it thereto:

*Example 1.*—152 parts by weight of 3-nitro-4-amino-1-methylbenzene are diazotized in the customary manner with 300 parts by weight of commercial hydrochloric acid and 69 parts by weight of sodium nitrite, and the diazo solution is gradually added to a cooled alkaline solution of 303 parts by weight of 1-naphthylamine-2.4-disulfonic acid. The alkali salt thereupon separates out to a large extent and can be completely isolated by the addition of sodium chloride. After filtering and drying, it forms a brown powder, the solution of which in water shows no formation of dyestuff, for example with naphthol-sulfonic acids. It is readily reconverted by means of acids to 1-naphthylamine-2.4-disulfonic acid and 3-nitro-1-methylbenzene-4-diazonium salt. The compound has in the free state the following formula:

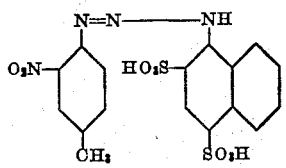

*Example 2.*—A solution of 2.5-dichlorobenzene-1-diazonium chloride prepared in the usual manner by diazotizing 161 parts by weight of 2.5-dichloroaniline are slowly introduced into a neutral solution prepared from 383 parts by weight of 2-naphthylamine-4.6.8-trisulfonic acid, and the acid reacting solution is neutralized by the addition of sodium acetate. After a short time the formation of the diazoamino compound of the formula:

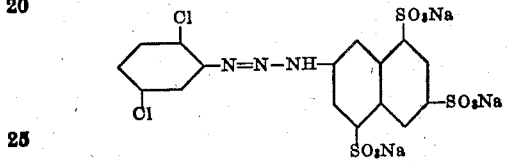

is complete. It is separated by the addition of common salt, filtered and dried. In aqueous solution it is split up into the two starting components by the addition of an acid.

*Example 3.*—If in example 2 the 2.5-dichloroaniline is replaced by the equivalent quantity of m-chloroaniline and the 2-naphthylamine-4.6.8-trisulfonic acid by the corresponding quantity of 2-naphthylamine-6.8-disulfonic acid, there is obtained in an analogous process the diazoamino compound of the formula:

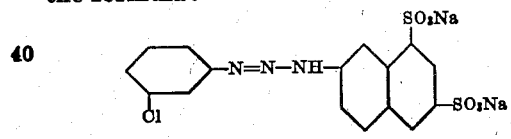

being a yellowish powder, easily soluble in water and being split up into the two starting components by the addition of an acid to its aqueous solution.

*Example 4.*—In a manner analogous to that described in Example 1 there is obtained by coupling about molecular quantities of diazotized 1-chloro-2-aminonaphthalene and 2-naphthylamine-4.6.8-trisulfonic acid a diazoamino compound being in form of its neutral sodium salt a yellowish powder, easily soluble in water and being split up into the two starting components by the addition of an acid to its aqueous solution.

*Example 5.*—22.3 parts by weight of 1-aminoanthraquinone are diazotized in strong sulfuric acid with nitrosylsulfuric acid. The diazonium sulfate formed is isolated by pouring the mixture onto ice and filtering. Then the diazonium sulfate is made into a paste with cold water, and this paste is slowly introduced into a cold alkaline solution prepared from 31 parts by weight of 1-naphthylamine-2.4-disulfonic acid. The alkali metal salt of the diazo amino compound partially separates, and the separation is completed by the addition of common salt. It forms a yellowish powder, soluble in water and is split up in aqueous solution into the two starting components with mineral acid.

We claim:

1. As new products the compounds of the probable general formula:

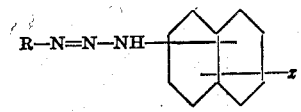

wherein R stands for the radical of a diazotizable amine suitable for producing azo dyestuffs which may be substituted by substituents of the group consisting of alkyl, the nitro group and halogen, and $x$ stands for a substituent of the group consisting of the sulfonic- and carboxylic acid groups, being in form of their alkali metal salts generally brownish- to yellowish substances which are generally easily soluble in water and which are split up into a primary aromatic amine and a naphthylamine-sulfonic- or carboxylic acid by the addition of an acid to their aqueous solutions.

2. As new products the compounds of the probable general formula:

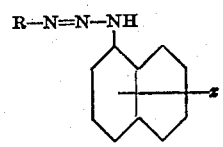

wherein R stands for the radical of a diazotizable amine suitable for producing azo dyestuffs which may be substituted by substituents of the group consisting of alkyl, the nitro group and halogen, and $x$ stands for a substituent of the group consisting of the sulfonic- and carboxylic acid groups, being in form of their alkali metal salts generally brownish to yellowish substances which are generally easily soluble in water and which are split up into a primary aromatic amine and a naphthylamine-sulfonic- or carboxylic acid by the addition of an acid to their aqueous solutions.

3. As new products the compound of the probable general formula:

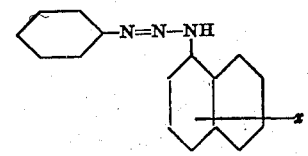

wherein $x$ stands for a substituent of the group consisting of the sulfonic- and carboxylic acid groups, and wherein the benzene nucleus may be further substituted by substituents of the group consisting of alkyl, the nitro group and halogen, being in form of their alkali metal salts generally brownish to yellowish substances which are generally easily soluble in water and which are split up into an amine of the benzene series and a naphthylamine-sulfonic- or carboxylic acid by the addition of an acid to their aqueous solutions.

4. As new products the compounds of the probable formula:

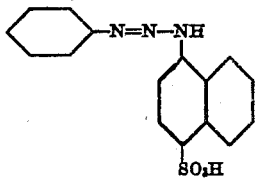

wherein the benzene nucleus may be further substituted by substituents of the group consisting of alkyl, the nitro group and halogen, being in form of their alkali metal salts generally brownish to yellowish substances which are generally easily soluble in water and which are split up into an amine of the benzene series and 1-naphthylamine-4-sulfonic-acid by the addition of an acid to their aqueous solutions.

5. As a new product the compound of the probable formula:

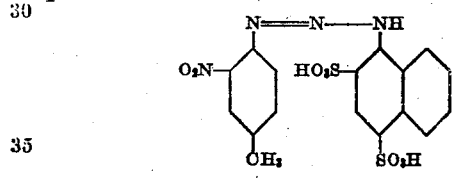

being in form of its alkali metal salts a brown powder, easily soluble in water and being gradually split up into a diazonium salt from 3-nitro-4-amino-1-methylbenzene and 1-naphthylamine-2.4-disulfonic acid.

In testimony whereof we have hereunto set our hands.

WINFRID HENTRICH. [L. S.]
ERNST TIETZE. [L. S.]
ANTON OSSENBECK. [L. S.]